April 21, 1925.  1,534,836
M. H. BREDE ET AL
KEY LOCKED CAP FOR TANKS
Filed Nov. 15, 1922
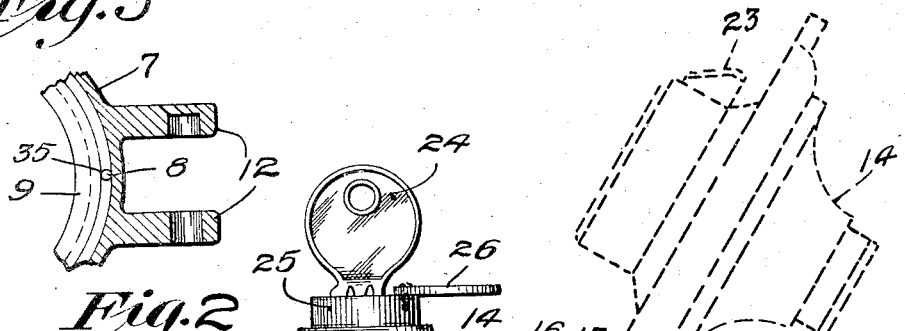
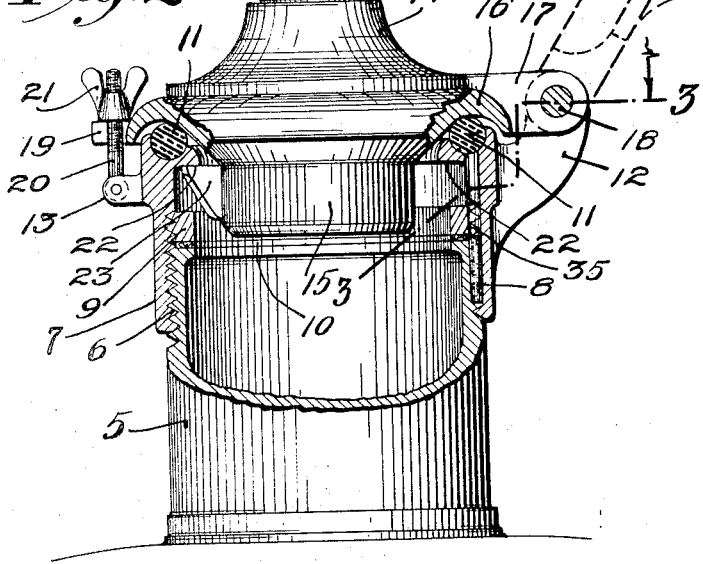
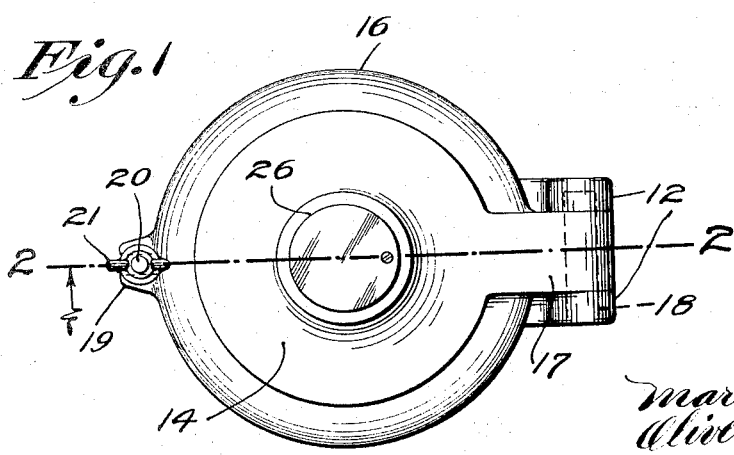

Patented Apr. 21, 1925.

1,534,836

UNITED STATES PATENT OFFICE.

MARTIN H. BREDE, OF MINNEAPOLIS, MINNESOTA, AND OLIVE L. LONGPRE, OF VALE, SOUTH DAKOTA.

KEY-LOCKED CAP FOR TANKS.

Application filed November 15, 1922. Serial No. 601,050.

*To all whom it may concern:*

Be it known that we, MARTIN H. BREDE and OLIVE L. LONGPRE, citizens of the United States, residing, respectively, at Minneapolis and Vale, in the counties of Hennepin and Butte and States of Minnesota and South Dakota, have invented certain new and useful Improvements in Key-Locked Caps for Tanks; and we do hereby declare the following to be a full, clear, and exact description of the invention, such as will enable others skilled in the art to which it appertains to make and use the same.

Our invention provides a simple and highly efficient key-locked cap for tanks and is especially intended for closing the filling tubes of automobile gasoline tanks and the necks of automobile radiators. Generally stated, the invention consists of the novel devices, arrangement and combinations of parts hereinafter described and defined in the claims.

It is a very frequent occurrence that gasoline is stolen from the tanks of automobiles. Not only does this stealing of gasoline cause considerable loss but it usually takes place when the draining of the tank causes very serious inconvenience and, indirectly, further loss of time and money.

In northern climates in cold weather, alcohol and other quite expensive radiator fluids are very generally used and it is not infrequent that the radiators have been drained to obtain these anti-freezing fluids. Our improved cap, when used for either of the above purposes, prevents stealing of the fluids and resulting inconveniences.

In the accompanying drawings, which illustrate the invention, like characters indicate like parts throughout the several views.

Referring to the drawings:

Fig. 1 is a plan view showing the improved key-locked radiator cap applied to the filler neck of a gasoline tank;

Fig. 2 is a view partly in side elevation and partly in section on the line 2—2 of Fig. 1; and Fig. 3 is a fragmentary horizontal section on the line 3—3 of Fig. 2.

The numeral 5 indicates the filler tube or neck of a gasoline tank, the same having the customary externally threaded portion 6 onto which the customary cap is generally screwed. In carrying out our invention, we provide an annular tube extension in the form of a collar 7 internally threaded so that it may be screwed onto the thread 6 of the tube 5. To positively lock the sleeve 7 to the tube 5, a small vertical hole is preferably bored through the engaged threads of said members 6 and 7, and a lock pin 8 is driven into said hole, as best shown in Figs. 2 and 3. Preferably, the collar 7 is provided with an internal annular lock nut or ring 9 between which and the upper end of the tube 5 a gasket 10 is interposed to thereby form a tight joint between the members 6, 7 and 9.

In its upper edge, the collar 7 is formed with an annular seat for a gasket 11 that is preferably of rubber and round in cross-section. In this preferred construction, the collar 7 is provided at one side with a pair of outstanding relatively large ears 12 and at the opposite side with outstanding relatively small ears 13.

A cap 14 is preferably a cast circular structure formed with a centrally depending portion 15 and with an outstanding flange 16, which latter rests on the gasket 11. At one side, this cap 14 has an outstanding ear 17 pivotally connected to the ears 12 by a hinge pin 18. At its opposite side, said cap is provided with a split lug 19, into the cap of which is adapted to be swung a clamping bow 20 that is hinged to the ears 13 and is provided at its threaded end with a thumb nut 21, which, when screwed onto the lug 19, tightly forces the cap onto the gasket 11.

Near its upper end, the collar 7 is formed with an inwardly projecting lock ledge 22, and for engagement therewith, the depending portion of the cap 14 is provided with a lock bolt 23 located diametrically opposite to the cap hinge. This lock bolt 23 is adapted to be moved radially by the customary or any other suitable lock mechanism actuated by a key 24 that is insertable into the customary keyhole or a lock case 25, which latter is permanently set axially into the cap 14. The said lock 25 may be of any suitable construction.

To prevent water and dirt from getting into the keyhole of the lock 25, the latter is shown as provided with a pivoted keyhole cover 26, shown as swung from working position in Fig. 2 but movable over the keyhole when the key has been removed from the lock. With the arrangement above described, the entire lock moves with the hinged cap to and from operative position.

By reference to Fig. 2, it will be noted that the hole for the insertion of the lock pin or key 8 is extended through the threads of the lock ring 9, as shown, at 35, and that the said pin at its upper end terminates below the lower plane of said lock ring. Hence, when the lock ring is slightly turned from the position shown in Fig. 2, the pin 8 is concealed where it cannot be discovered and cannot be removed. This very securely locks the collar 7 to the filler tube or neck.

What I claim is:

1. The combination with a filler tube or neck having a lock ledge, of a displaceable cap for said tube, a yielding gasket interposed between said tube and cap, clamping means for drawing said cap down upon said gasket and compressing the same, and a lock independent of said clamping means, mounted in said cap and including a lock bolt arranged to be projected under the lock ledge when the cap is drawn down by the clamping means and the gasket compressed.

2. The combination with a filler tube or neck, of a collar screwed onto the same, a clamping ring working with threaded engagement with the interior of said collar and reacting against the upper end of said tube, a lock pin insertable through coincident pin holes in the threads of said neck, collar and clamping ring, and the said ring being adapted to be turned to cover the upper end of said pin.

3. The structure defined in Claim 2 in further combination with a displaceable cap having a lock for securing the same to said collar.

4. The combination with a filler tube or neck, of a collar screw-threaded onto said tube and projecting above the same and having a lock-bolt-engaging detent, formed therewith above said tube a cap hinged to one side of said collar, said collar at the opposite side of the hinge having an external cap-engaging clamp, a compressible gasket interposed between said collar and cap, and a key-actuated lock mounted in said cap and including a lock bolt that is engageable with the detent of said collar when the cap is drawn down by the clamp and the gasket compressed.

In testimony whereof we affix our signatures.

MARTIN H. BREDE.
OLIVE L. LONGPRE.